US010820608B1

(12) United States Patent
Santhanam et al.

(10) Patent No.: US 10,820,608 B1
(45) Date of Patent: Nov. 3, 2020

(54) HARD CANDY CONFECTIONS WITH LOW HYGROSCOPICITY

(71) Applicant: THE HERSHEY COMPANY, Hershey, PA (US)

(72) Inventors: Balaji Santhanam, Harrisburg, PA (US); Julie Hickey, Hummelstown, PA (US); Burton Douglas Brown, Hershey, PA (US); Mahesh Venkatachalam, Glen Allen, VA (US)

(73) Assignee: THE HERSHEY COMPANY, Hershey, PA (US)

( * ) Notice: Subject to any disclaimer, the term of this patent is extended or adjusted under 35 U.S.C. 154(b) by 197 days.

(21) Appl. No.: 15/334,031

(22) Filed: Oct. 25, 2016

Related U.S. Application Data

(60) Provisional application No. 62/246,168, filed on Oct. 26, 2015.

(51) Int. Cl.
*A23G 3/42* (2006.01)
*A23G 3/46* (2006.01)

(52) U.S. Cl.
CPC .................. *A23G 3/42* (2013.01); *A23G 3/46* (2013.01); *A23V 2002/00* (2013.01)

(58) Field of Classification Search
CPC .................................... A23G 3/34; A23G 3/42
USPC ....................................................... 426/660
See application file for complete search history.

(56) References Cited

U.S. PATENT DOCUMENTS

| | | | |
|---|---|---|---|
| 3,934,048 | A | 1/1976 | Furda et al. |
| 4,208,432 | A | 6/1980 | Noborio et al. |
| 4,311,722 | A | 1/1982 | Vink et al. |
| 4,623,543 | A | 11/1986 | Motegi et al. |
| 4,753,816 | A | 6/1988 | Vink et al. |
| 4,870,059 | A | 9/1989 | Mitsuhashi et al. |
| 5,218,096 | A | 6/1993 | Shibuya et al. |
| 5,223,303 | A | 6/1993 | Taskinen |
| 5,314,701 | A | 5/1994 | Mentink et al. |
| 5,591,478 | A | 1/1997 | Tokunaga et al. |
| 6,180,152 | B1 | 1/2001 | Yoon |
| 6,455,096 | B1 | 9/2002 | Katagiri et al. |
| 6,562,382 | B1 | 5/2003 | Corriveau et al. |
| 6,616,956 | B2 | 9/2003 | Soldani et al. |
| 2001/0003005 | A1 | 6/2001 | Soldani et al. |
| 2002/0035248 | A1 | 3/2002 | Luhn |
| 2002/0058102 | A1 | 5/2002 | Makela et al. |
| 2003/0113435 | A1 | 6/2003 | Le |
| 2004/0014714 | A1 | 1/2004 | Kussendrager et al. |
| 2007/0202243 | A1 | 8/2007 | Arenz et al. |
| 2007/0269577 | A1 | 11/2007 | Pershad et al. |
| 2008/0213459 | A1 | 9/2008 | Isse et al. |

FOREIGN PATENT DOCUMENTS

| | | | | |
|---|---|---|---|---|
| CA | 2403457 | A1 | 10/2001 | |
| CN | 101124935 | | 2/2008 | |
| EP | 0437927 | | 7/1991 | |
| GB | 1481738 | A * | 8/1977 | ............... A23G 3/42 |
| JP | 11289987 | | 10/1999 | |
| JP | 2000342184 | | 12/2000 | |
| JP | 2002034459 | | 2/2002 | |
| JP | 2006254906 | | 9/2006 | |
| RU | 2127063 | | 3/1999 | |
| RU | 2004120881 | | 1/2006 | |
| WO | 9703569 | | 2/1997 | |
| WO | WO-0176383 | A1 * | 10/2001 | ............... A23G 3/42 |
| WO | 01/89313 | A1 | 11/2001 | |

OTHER PUBLICATIONS

W. Vink, "Hard Candy—Is It What We Really Think It Is?," 1998, p. 81-88.

* cited by examiner

*Primary Examiner* — Jyoti Chawla
(74) *Attorney, Agent, or Firm* — McNees Wallace & Nurick LLC

(57) ABSTRACT

A confection is formed of a mixture including at least one first simple carbohydrate, at least one non-hygroscopic second simple carbohydrate, and at least one hydrocolloid. In some embodiments, the non-hygroscopic second simple carbohydrate includes disaccharides, trisaccharides, or combinations thereof. In some embodiments, the hydrocolloid includes a starch hydrolysate having a dextrose equivalent less than 36, and the confection is substantially free of starch hydrolysates having a dextrose equivalent of 36 or greater. In some embodiments, the confection is a hard candy. A method of making a confection includes mixing at least one first simple carbohydrate, at least one non-hygroscopic second simple carbohydrate, and at least one hydrocolloid to form a mixture. The method also includes heating the mixture, cooking the mixture to a predetermined moisture content, and cooling and working the mixture to form the confection comprising the mixture.

18 Claims, No Drawings

HARD CANDY CONFECTIONS WITH LOW HYGROSCOPICITY

CROSS-REFERENCE TO RELATED APPLICATIONS

This application claims priority to and the benefit of U.S. Provisional Application No. 62/246,168 filed Oct. 26, 2015, which is hereby incorporated by reference in its entirety.

FIELD

This application is directed to a confectionery product. More particularly, the present invention is directed to a hard candy that has low hygroscopicity.

BACKGROUND

Hard candy, a well-known class of confectionery, is a popular sweet. Hard candies are generally made with two major ingredients, sucrose and corn syrup. These are cooked to high temperatures to remove moisture and then cooled rapidly to form a sugar glass. The sucrose provides sweetness and texture while the corn syrup is used to prevent graining (sugar crystallization), as well as to control viscosity and flavor release in some cases.

However, corn syrup has numerous drawbacks when used in making hard candy. It readily attracts moisture from the atmosphere, which manifests itself as surface stickiness in the hard candy. This leads the candy to stick to wrappers, or if unwrapped, to one another and/or the hand of the consumer. The moisture absorption can happen quickly and significantly enough to even pose problems during candy manufacturing.

Prior attempts to solve stickiness problems with hard candy have generally focused on employing sugar alcohols as an alternative to sucrose or by applying a coating to sugar based hard candy containing anti-stick agents, such as fat based ingredients, or by sanding with sugar. Other prior solutions have replaced traditional 43 dextrose equivalent (DE) corn syrup with corn syrups of lower DE, such as 36 DE corn syrup, or with high maltose corn syrups. However, these materials are still highly hygroscopic and thus do little to solve the stickiness problem and do not provide a satisfactory result.

SUMMARY

Providing a hard candy confection that addresses one or more of the foregoing problems is desirable. Exemplary embodiments are directed to a non-sticky hard candy confection comprising a first simple carbohydrate, such as sucrose, a second, non-hygroscopic simple carbohydrate, and a hydrocolloid. The hard candy confection is preferably free of starch hydrolysates having a dextrose equivalent (DE) of 36 or greater. Monosaccharides consisting of glucose and fructose in the finished product may be less than 6%, alternatively less than 4%, or alternatively less than 2%, by weight.

A non-hygroscopic carbohydrate is a carbohydrate of the same or higher molecular weight than sucrose that has a lower solubility in water than sucrose. The term hydrocolloid refers to long chain hydrophilic polysaccharides that form viscous compositions and/or gels when dispersed in water. Hydrocolloids, as used herein, may be derived from plants or seeds or may be of microbial origin. Hydrocolloids may include, but are not limited to, starch, cellulose, and gelatin, and their derivatives; pectin; and polysaccharide gums, including, but not limited to, xanthan, agar, and carrageenan. Hydrocolloids may also be derived by chemical treatment. For example, hydrocolloids include starch hydrolysates having a DE of less than 36.

Among the advantages of exemplary embodiments is that a hard candy is provided that does not require a primary wrapper. As a result, multiple hard candies may be stored directly with one another in the same package or container without sticking to one another, resulting in an instantly consumable hard candy.

Another advantage of exemplary embodiments is that a hard candy confection is provided that can survive high humidity and high temperature conditions for extended periods without deformation.

Still another advantage is that exemplary embodiments remain non-sticky to the touch for up to 38 days under open conditions of 75° F. (24° C.)/80% relative humidity (RH).

Other features and advantages of the present invention will be apparent from the following more detailed description of exemplary embodiments that illustrate, by way of example, the principles of the invention.

DETAILED DESCRIPTION OF EXEMPLARY EMBODIMENTS

Exemplary embodiments are directed to a non-sticky hard candy confection comprising a first simple carbohydrate, a non-hygroscopic second simple carbohydrate, and a hydrocolloid. The hard candy confection is preferably free of starch hydrolysates having a dextrose equivalent (DE) of 36 or greater. The hard candy may be used in a laminate construction or other combination with one or more other constituents, such as fat-based ingredients, in forming a confection. In some embodiments, the first simple carbohydrate comprises sucrose. In some embodiments, the first simple carbohydrate consists of sucrose. The second carbohydrate is also a simple carbohydrate and is non-hygroscopic. In some embodiments, the non-hygroscopic second simple carbohydrate includes disaccharides, trisaccharides, or a combination thereof. Suitable components for the second simple carbohydrate include, but are not limited to, lactose, trehalose, and combinations thereof. The hydrocolloid is preferably, but not necessarily, a starch hydrolysate, such as maltodextrin and/or corn syrup, having a DE less than 36. The maltodextrin may have a dextrose equivalent that ranges from 1 DE to 20 DE, such as 4 DE or 10 DE, for example. The corn syrup preferably has a DE of less than 36 and more preferably less than 25.

In some embodiments, the hard candy is a combination of sucrose, lactose, and maltodextrin. Surprisingly, despite maltodextrin's traditional exclusion from hard candy because of its difficulty in processing, including its high viscosity and propensity to foam under vacuum processing, when maltodextrin is cooked with sucrose, the two carbohydrates form a hard candy, which is not sticky to the touch under extreme environmental conditions. In some embodiments, the combined amount of the non-hygroscopic second simple carbohydrate and hydrocolloid is present from about 3% to about 50% by weight, alternatively from about 15% to about 30% by weight, in the formulation. The amount of hydrocolloid in the formulation is preferably about 1% to about 20% by dry weight of the formulation, alternatively about 5% to about 20%, or alternatively about 10% to about 15%.

In some embodiments, the confection consists essentially of the first and second carbohydrates and the hydrocolloid, with a reasonable amount of flavor, color, and/or other additives, such as, for example up to about 2% by weight or alternatively up to about 1% by weight of the confection, to achieve the desired effect.

In other embodiments, the confection includes fat and may include one or more dairy ingredients. Exemplary dairy ingredients which may be employed include, without limitation, light cream, heavy cream, butter, milk, whey, whey permeate, and whey protein. Embodiments which contain dairy or other fats include flavorings and other additives. It will be appreciated that in embodiments in which dairy is employed that the presence of the second simple carbohydrate may be achieved by the lactose in the dairy without the need to incorporate the second simple carbohydrate through the separate addition of ingredients.

Once formulated, the hard candies in accordance with exemplary embodiments may be manufactured in accordance with any technique for forming a hard candy.

In forming embodiments the ingredients to be cooked are mixed. This mixture generally consists of the first and second carbohydrates and the hydrocolloid, although water may be added. In particular, when maltodextrin is used as the hydrocolloid, this may be first dispersed in warm water, by using, for example, a high shear mixer, prior to addition to the mixture.

The mixture is then cooked until the desired final moisture content is reached, which is typically less than 5% by weight, such as about 4% by weight or less to achieve a hard candy. In some embodiments, the mixture may be cooked under vacuum to drive the moisture off more rapidly and/or at lower temperatures.

Once the desired moisture content is reached, the product is typically transferred to a cold table to cool until hardening into a malleable, semi-plastic form. The product may then be transferred to a hot table to maintain malleability while also working the mass to add edible acids and/or flavorings. The product may then be cooled and formed into pieces, such as with a drop roller, extruder or other suitable mechanical device. Alternatively, the hard candy may be processed in any other desired manner in the same manner as any other hard candy confection.

In embodiments in which the confection is a hard candy that includes fat and/or dairy ingredients, the process may be carried out in generally the same way.

Similarly, laminated confections may be formed by one or more alternating layers of the hard candy and a fat filling. For example, in one embodiment a fat based crème (about 10% to about 40% by weight of the total hard candy mass) is spread uniformly in the middle of a non-sticky hard candy as described herein, with the edges of the hard candy left free from filling and then moistened (e.g. misting, steaming, wet sponge, etc.) and then folded together to form a filled roll with closed ends. The lamination begins by stretching the crème center filled roll to several times its initial length and multiply folding in the middle. The laminated roll is then placed on a second hard candy, which forms an outer cover. The outside edges of the second hard candy are moistened and then folded together to close the laminated roll, with the now-wrapped laminated roll stretched to form a rope that is cut in pieces of desired length.

The hard candies produced according to the present invention are less sticky and absorb less moisture when compared with candies made with corn syrups having a DE greater than or equal to 36. The hard candy or laminated form according to the present invention does not require a primary wrapper. These products can survive extended periods (greater than 14 days) at high temperatures and humidity conditions (85° F. (29° C.)/70% relative humidity (RH)) and remain free-moving (non-sticky) up to 38 days under open conditions of 75° F. (24° C.)/80% RH.

Exemplary embodiments are further described and illustrated with respect to the following examples which are presented by way of explanation, not of limitation.

EXAMPLES

Examples 1-5

Examples 1 through 5 (in which Example 1 was a control using a conventional mixture of sucrose and high DE corn syrup) were formulated as shown in Table 1.

In each of the examples, sufficient water was added to the precooked mixture such that all ingredients were either dissolved or dispersed. In each of the examples, the ingredients were mixed in a kettle. In formulations containing maltodextrin, the maltodextrin was first dispersed in warm water using a high shear mixer and then added to the kettle.

TABLE 1

| | Formulation (Dry wt %) | | | | |
|---|---|---|---|---|---|
| | Example 1 | Example 2 | Example 3 | Example 4 | Example 5 |
| Sucrose | 45.0 | 75.0 | 60.0 | 71.3 | 60.0 |
| Corn syrup (DE = 42) | 55.0 | 0.0 | 0.0 | 0.0 | 0.0 |
| Lactose | 0.0 | 25.0 | 20.0 | 23.8 | 0.0 |
| Trehalose | 0.0 | 0.0 | 0.0 | 0.0 | 20.0 |
| Maltodextrin (DE = 4) | 0.0 | 0.0 | 0.0 | 5.0 | 0.0 |
| Maltodextrin (DE = 10) | 0.0 | 0.0 | 20.0 | 0.0 | 20.0 |
| Monosaccharides in finished product | 15.4 | 1.5 | 3.5 | 2.6 | 2.9 |

The mixture was then cooked under vacuum (−0.2 bar) until it reached 286° F. (141° C.). The vacuum was vented and the product transferred to a cold table where it was allowed to cool for a brief time until it hardened to a malleable semi-plastic form. Samples of each example were formulated with colorant, flavorant, and acid. The product was transferred to a hot table at 185° F. (85° C.) to maintain its malleability. The product was cooled back to 165° F. (74° C.) on the cold table and made into spherical pieces using a drop roller.

Samples were placed in a small cup and then held in a controlled environment of 85° F. (29.4° C.) at 70% relative humidity. The samples were examined periodically over 14 days. The samples were qualitatively evaluated at each examination and the condition noted as one of the following with the corresponding letter for each condition used in summarizing the results in Table 2:

Pieces moved freely without bumping of the cup (A)
Pieces moved easily after bumping of the cup (B)
Some pieces moved easily after bumping of the cup, others stayed fast (C)
Pieces remained attached to one another, but did not exhibit any flow (D)
Pieces exhibited flow as evidenced by shape change (E)
Pieces exhibited flow as evidenced by bottom of cup at least 40% covered (F)
Pieces exhibited flow as evidenced by entire bottom of cup covered (G)

TABLE 2

| | 85° F. (29.4° C.), 70% relative humidity | | | |
|---|---|---|---|---|
| | Day 1 | Day 2 | Day 8 | Day 14 |
| Example 1 | F | G | G | G |
| Example 2 | A | B | A | A |
| Example 3 | D | D | D | D |
| Example 4 | B | A | A | A |
| Example 5 | C | C | C | C |

The control, Example 1, exhibited flow, with at least 40% of the bottom of the cup covered within a day and the entire bottom of the cup covered by the second day under the storage conditions. Under the same storage conditions, Examples 2 through 5, which contained no corn syrup, fared much better. The pieces in comparative Example 2, which did not include a hydrocolloid, moved easily after bumping of the cup on Day 2 and otherwise moved freely without bumping of the cup on Days 1, 8, and 14. Without a hydrocolloid, however, the surface of the pieces in comparative Example 2 became unacceptably whitened and opaque and the texture of the pieces was inferior. The pieces in Example 3 remained attached to one another but did not exhibit any flow from Day 1 through Day 14. The pieces in Example 4 moved easily after bumping of the cup on Day 1, but otherwise the pieces moved freely without bumping of the cup through Day 14. Some pieces in Example 5 moved easily after bumping of the cup, while others stayed fast from Day 1 through Day 14. The presence of the hydrocolloid in Examples 3 through 5 was observed to prevent surface whitening and opacity in contrast to comparative Example 2, allowing the samples of Examples 3 through 5 to retain their original coloring throughout their observed shelf-life.

Examples 6-9

Examples 6 through 9 were formulated as shown in Table 3. Examples 6-9 were prepared as dairy-containing hard candies, in which Example 6 was a control using traditional sucrose and high maltose corn syrup. The "dairy" ingredient was a blend including whey, whey permeate, heavy cream, and butter. The lactose in the dairy ingredient served as the non-hygroscopic second simple carbohydrate in Examples 6-9. The hard candies were formed using generally the same process as for Example 1, except that after the ingredients were all incorporated, the mixture was cooked in an open kettle to about 300° F. (149° C.) to a moisture level between about 2% to 4% by weight. The hot candy mass was transferred to a cold table where it was allowed to cool for a brief time until it hardened to a malleable semi-plastic form. The product was transferred to a hot table that was held at 185° F. (85° C.) to maintain its malleability until it was formed into spherical pieces using a drop roller.

TABLE 3

| | Formulation (Dry wt %) | | | |
|---|---|---|---|---|
| | Example 6 | Example 7 | Example 8 | Example 9 |
| Sucrose | 50.34 | 66.59 | 64.55 | 63.1 |
| High maltose corn syrup (43 DE) | 30.59 | 0.0 | 0.0 | 0.0 |
| Salt | 1.06 | 0.68 | 0.66 | 0.68 |
| Dairy | 17.84 | 18.22 | 20.91 | 21.77 |
| Lactose from dairy | 2.1 | 2.1 | 5.1 | 5.2 |
| Flavorings | 0.01 | 0.01 | 0.01 | 0.01 |
| Emulsifier | 0.11 | 0.11 | 0.1 | 0.11 |
| Maltodextrin (18 DE) | 0.0 | 9.15 | 0.0 | 0.0 |
| Maltodextrin (4 DE) | 0.0 | 5.18 | 13.71 | 5.19 |
| Corn syrup solids (20 DE) | 0.0 | 0.0 | 0.0 | 9.08 |
| Monosaccharides in finished product | 7.0 | 3.8 | 5.1 | 4.1 |

In the same manner as Examples 1-5, samples of Examples 6-9 were placed in a small cup, 3 pieces per cup, and then held in a controlled environment of 85° F. (29.4° C.) at 70% relative humidity and examined periodically over 14 days. The samples were qualitatively evaluated, the results of which are shown in Table 4, using the same scale as Examples 1-5.

The control, Example 6, exhibited flow, with at least 40% of the bottom of the cup covered within a day and the entire bottom of the cup covered by the second day under the storage conditions. Under the same storage conditions, Examples 7 through 9, which contained no corn syrup, fared much better. The pieces in Examples 7 and 8 moved easily after bumping of the cup on Day 1, but otherwise the pieces moved freely without bumping of the cup through Day 14. The pieces in Example 9 moved easily after bumping of the cup on Days 1 and 2, and moved freely without bumping of the cup on Day 7, but remained attached to one another without exhibit any flow at Day 14.

TABLE 4

| | 85° F. (29.4° C.), 70% relative humidity | | | |
|---|---|---|---|---|
| | Day 1 | Day 2 | Day 8 | Day 14 |
| Example 6 | F | G | G | G |
| Example 7 | B | A | A | A |
| Example 8 | B | A | A | A |
| Example 9 | B | B | A | D |

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A confection formed of a mixture comprising:
   at least one first simple carbohydrate;
   at least one non-hygroscopic second simple carbohydrate; and
   at least one hydrocolloid, wherein the at least one hydrocolloid is present in the mixture in an amount in the range of 1% to 25%, by weight of the mixture;
   wherein the confection is substantially free of any starch hydrolysates having a dextrose equivalent of 36 or greater.

2. The confection of claim 1, wherein the confection is a hard candy and the at least one first simple carbohydrate comprises sucrose.

3. The confection of claim 1, wherein the mixture consists of the at least one first simple carbohydrate, the at least one non-hygroscopic second simple carbohydrate, the at least one hydrocolloid, and additives in a total amount up to 2% by weight of the mixture, and wherein the at least one first simple carbohydrate comprises sucrose.

4. The confection of claim 1, wherein the at least one non-hygroscopic second simple carbohydrate is selected from the group consisting of disaccharides, trisaccharides, and combinations thereof.

5. The confection of claim 1, wherein the at least one non-hygroscopic second simple carbohydrate is selected from the group consisting of lactose, trehalose, and combinations thereof.

6. The confection of claim 1, wherein the mixture comprises a dairy ingredient containing the non-hygroscopic second simple carbohydrate.

7. The confection of claim 1, wherein the at least one hydrocolloid is selected from the group consisting of starch, a starch derivative, cellulose, a cellulose derivative, gelatin, a gelatin derivative, pectin, a polysaccharide gum, xanthan gum, agar, carrageenan, and a combination thereof.

8. The confection of claim 1, wherein the at least one hydrocolloid is a starch hydrolysate.

9. The confection of claim 1, wherein the at least one hydrocolloid is a starch hydrolysate having a dextrose equivalent less than 25.

10. The confection of claim 1, wherein the at least one hydrocolloid is a starch hydrolysate having a dextrose equivalent of 20 or less.

11. The confection of claim 1, wherein the at least one hydrocolloid comprises maltodextrin.

12. The confection of claim 1, wherein the at least one hydrocolloid is present in the mixture in an amount in the range of 5% to 20%, by weight of the mixture.

13. The confection of claim 1, wherein the at least one hydrocolloid is present in the mixture in an amount in the range of 10% to 15%, by weight of the mixture.

14. The confection of claim 1, wherein the at least one non-hygroscopic second simple carbohydrate and the at least one hydrocolloid are present in the mixture in a combined amount in the range of 3% to 50%, by weight of the mixture.

15. The confection of claim 1, wherein the confection contains less than 4% glucose and fructose, in combination, by weight.

16. A confection comprising a hard candy formed from a mixture comprising:
   a first simple carbohydrate comprising sucrose being present in an amount of at least 60% by dry weight of the mixture;
   a non-hygroscopic second simple carbohydrate selected from the group consisting of disaccharides, trisaccharides, and combinations thereof, the non-hygroscopic second simple carbohydrate being present in an amount of at least 2.1% by dry weight of the mixture; and
   a hydrocolloid comprising a starch hydrolysate having a dextrose equivalent of less than 36, the hydrocolloid being present in an amount in the range of 5% to 20% by dry weight of the mixture, the mixture being substantially free of starch hydrolysates having a dextrose equivalent of 36 or greater.

17. The confection of claim 16, wherein the hard candy has a moisture content of 4% or less by weight.

18. The confection of claim 16, wherein the first simple carbohydrate consists of sucrose.

* * * * *